United States Patent
Heinrich et al.

(10) Patent No.: US 8,718,026 B2
(45) Date of Patent: May 6, 2014

(54) METHOD FOR ASSOCIATING TIME SLOTS WITH A TRANSMISSION PATH IN A WIRELESS INTERCONNECTED NETWORK

(75) Inventors: Andreas Heinrich, Munich (DE); Matthias Scheffel, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 53 days.

(21) Appl. No.: 13/574,578

(22) PCT Filed: Jan. 19, 2011

(86) PCT No.: PCT/EP2011/050643
§ 371 (c)(1), (2), (4) Date: Jul. 20, 2012

(87) PCT Pub. No.: WO2011/089134
PCT Pub. Date: Jul. 28, 2011

(65) Prior Publication Data
US 2012/0294292 A1 Nov. 22, 2012

(30) Foreign Application Priority Data
Jan. 22, 2010 (EP) .................................. 10000624

(51) Int. Cl.
*H04W 72/08* (2009.01)
(52) U.S. Cl.
USPC .......................................... 370/336; 370/329
(58) Field of Classification Search
None
See application file for complete search history.

(56) References Cited

U.S. PATENT DOCUMENTS

| 6,738,619 | B1* | 5/2004 | Yabuta et al. ................ 455/423 |
| 7,420,980 | B1* | 9/2008 | Pister et al. .................. 370/401 |
| 7,764,643 | B2* | 7/2010 | Mizusawa ..................... 370/328 |
| 8,290,429 | B2* | 10/2012 | Imaeda ............................ 455/7 |
| 2002/0063932 | A1* | 5/2002 | Unitt et al. ..................... 359/168 |
| 2006/0007904 | A1* | 1/2006 | Shimomura et al. .......... 370/342 |
| 2011/0019565 | A1* | 1/2011 | Nezou et al. .................. 370/252 |

FOREIGN PATENT DOCUMENTS

WO WO 2008070871 A2 * 6/2008 ............ H04W 72/04

OTHER PUBLICATIONS

Sahlnoglu, Z. at al.: >> TG4e drafting—Draft specification for IEEE 802.15.4e Factory Automationα, IEEE 802.15.4 document 15-09/401r3, Jul. 2009; Others.

(Continued)

*Primary Examiner* — Asad Nawaz
*Assistant Examiner* — Parth Patel
(74) *Attorney, Agent, or Firm* — Cozen O'Connor

(57) ABSTRACT

A method of associating time slots with a transmission path in a wireless interconnected network made of a plurality of network nodes such that the transmission path extends between a source node and a destination node and comprises a plurality of sequential links between adjacent network nodes, data being transmitted in the network on a time slot basis by the association of the time slots to be used with the links of the transmission path, wherein a quality value is determinable for each link within an association sequence of time slots describing an end-to-end data transmission from the source node to the destination node along the transmission path, where the value represents the reliability of the data transfer. An overall quality value for the association sequence can further be determined as a function of the quality values of each of the links.

12 Claims, 2 Drawing Sheets

(56) References Cited

OTHER PUBLICATIONS

Chen, Phoebus Wei-Chih: Wireless Sensor Network Metrics for Real-Time Systems. Doktorarbeit, EECS Department, University of California, Berkeley, May 2009; Others.

Chen, Phoebus und Shankar Sastry: Latency and connectivity analysis tools for wireless mesh networks. In: RoboComm '07: Proceedings of the 1st international conference on Robot communication and coordination, Seiten 1-8, Piscataway, NJ, USA, 2007. IEEE Press.; Others.

Kristofer Pister, K. S. J. und Robert M. Shear: Digraph Network Superframes (US Patent 7420980B1), Patent, Jun. 2005; Others.

Pesonen, Joonas, Haibo Zhang, Pablo Soldati und Mikael Johansson: Methodology and Tools for Controller-Networking Co-design in WirelessHART. In: 14th IEEE International Conference on Emerging Technologies and Factory Automation (EFTA). Mallorca, Spain, Sep. 2009 (To appear).; Others.

Rowe, A., R. Mangharam und R. Rajkumar: RT-Link: A Time-Synchronized Link Protocol for Energy-Constrained Multi-hop Wireless networks. In: Sensor and Ad Hoc Communications and Networks, 2006. SECON '06, 2006 3rd Annual IEEE Communications Society on, Band 2, Seiten 404-411, 2006.; Others.

Soldati, Pablo, Haibo Zhang und Mikael Johansson: Deadline-constrained transmission scheduling and data evacuation in wirelessHART networks. Technischer Bericht, Automatic Control Lab, School of Electrical Engineering, Royal institute of Technology (KTH), SE-100 44, Stockholm, Sweden, Sep. 2008; Others.

Zhang, Haibo, Pablo Soldati und Mikael Johansson: Efficient Link; Scheduling and Channel Hopping for Convergecast in WirelessHART Networks. Technischer Bericht, Automatic Control Lab, School of Electrical Engineering, Royal Institute of Technology (KTH), SE-10044, Stockholm, Sweden, Sep. 2009.; Others.

Zhang, Haibo, Pablo Soldati and Mikael Johansson: Optimal Link Scheduling and Channel Assignment for Convergecast in Linear WirelessHART Networks. Technischer Bericht, Automatic Control Lab, School of Electrical Engineering, Royal Institute of Technology (KTH), SE-100 44, Stockholm, Sweden, Jan. 2009.; Others.

Quang, Bui Dang und Hwang Won-Joo; Trade-off between Reliability and Energy Consumption in Transport Protocols for Wireless Sensor Networks. International Journal of Computer Science and Network Security, 6(8b), Aug. 30, 2006.; Others.

HART Communication Foundation: Online: http://www.hartcomm.org; Others.

Website Profinet, Profibus: http://www.profibus.com/Online; Others.

Pablo Soldati et al: "Optimal Routing and Scheduling of Deadline-Constrained Traffic over Lossy Networks", Globecom 2010, 2010 IEEE Global Telecommunications Conference, IEEE, Piscataway, NJ, USA, Dec. 6, 2010, Seiten 1-6; Others.

Najah A Abu Ali et al: "IEEE 802.16 Mesh Schedulers: Issues and Design Challenges", Jan. 1, 2008, IEEE Network, IEEE Service Center, New York, NY, US, pp. 58-65; Others.

\* cited by examiner

METHOD FOR ASSOCIATING TIME SLOTS WITH A TRANSMISSION PATH IN A WIRELESS INTERCONNECTED NETWORK

CROSS-REFERENCE TO RELATED APPLICATIONS

This is a U.S. national stage of application No. PCT/EP2011/050643 filed 19 Jan. 2011. Priority is claimed on European Application No. 10000624.6 filed 22 Jan. 2010, the content of which is incorporated herein by reference in its entirety.

BACKGROUND OF THE INVENTION

1. Field of the Invention

The invention relates to a method for associating time slots with a transmission path in a wireless interconnected network consisting of a plurality of network nodes and to a method for transmission of data using the method for associating the time slots. The invention also relates to a network management unit and to a wireless interconnected network.

2. Description of the Related Art

Wireless interconnected networks, which are also frequently referred to as mesh networks, are based on the principle of data being transferred over a plurality of communicating network nodes with wireless communication functionality from one network node to another via hops (i.e., forwarding through other nodes). These networks are structured so that a number of other network nodes to which data can be sent lie within range of a network node. Data transmission in such a network between a source node and a destination node is described by a transmission path consisting of corresponding wireless links between neighboring network nodes. What are referred to as scheduling methods, with which the links of a transmission path are allocated time slots, are used to guarantee collision-free transmission along such a transmission path. Within a time slot, data can only be transmitted in a corresponding radio channel on that link to which the time slot is allocated.

Conventional scheduling methods are optimized for the most reliable possible data transmission along a transmission path, without taking account, however, of further criteria and especially of the possibility of low energy consumption of the individual network nodes during data transmission. Such energy-efficient data transmission is of great importance, however, for specific types of mesh network, which frequently comprise sensor networks with autonomous energy supply.

SUMMARY OF THE INVENTION

It is therefore an object of the invention is to implement the assignment of time slots to a transmission path in a wireless mesh network such that, as part of data transmission, an energy-efficient operation of the network node with continued good reliability of data transmission is guaranteed.

This and other objects and advantages are achieved in accordance with the invention by a method in which time slots are assigned to a transmission path in a wireless mesh network comprising a plurality of network nodes, with the transmission path extending between a source node and a destination node in the network and comprising a plurality of consecutive links between neighboring network nodes. In such cases, data in the network is to be transmitted time slot-based to the links of the transmission path by the assignment of time slots to be used for data transmission.

As part of the method in accordance with the invention, a quality value is able to be determined for the respective link within an assignment sequence of time slots, which describes an end-to-end data transmission to the destination node along the transmission path. This quality value is produced from the number of time slots assigned to the link within the assignment sequence and a predetermined quality value, where the predetermined quality value describes the reliability of the data transmission on the respective link for an individual time slot assigned to the respective link and where an overall quality value for the assignment sequence is able to be determined as a function of the quality values of the respective links.

In accordance with the invention, the assignment sequence is specified as follows:

The links of the transmission path are first each assigned a time slot in succession and the overall quality value is determined for the resulting intermediate assignment sequence;

While the overall quality value is lower than a minimum quality value, the following step i) is executed and otherwise the intermediate assignment sequence is defined as the assignment sequence determined:

i) The link having the lowest quality value within the intermediate assignment sequence is assigned a further time slot directly after the time slot or time slots which is or are already assigned to the link, and subsequently the overall quality value is determined for the new intermediate assignment sequence thus produced.

The overall quality value determined in step i) is thus continuously checked to determine whether it is larger than or precisely the same size as a predetermined minimum quality value. If this is not the case step i) is repeated. The method of the invention has the advantage of, on the one hand, guaranteeing a predetermined minimum quality of data transmission along the transmission path and, on the other hand, ensuring energy-efficient usage of the corresponding time slots by the network nodes. The inventors have been able to prove as part of simulations that the method of the invention, when compared to other assignment strategies, leads to a lower energy consumption of the network nodes with the same transmission quality.

In an especially preferred embodiment of the method, in the event of a number of links having the same lowest quality value in the above step i), a further time slot is assigned to that link that is closest to the destination node in accordance with the transmission path. This takes into account a non-successful data transmission at the end of the transmission path leading to a worse energy balance than when transmission was unsuccessful right at the start of the transmission path.

The predetermined quality value of a respective link for an individual time slot can be defined in different ways. It merely has to be ensured that the quality value represents a value that represents in a suitable manner the reliability of the data transmission on the respective link in an individual time slot. For example, the quality value can present a value that represents the stability of the data transmission on the respective link. In an especially preferred embodiment, the predetermined quality value for a respective link is represented by a probability value that is the result of the difference between 100% probability and a predetermined probability of an unsuccessful data transmission on the respective link in an individual time slot.

If the predetermined probability described above of an unsuccessful data transmission is taken into account in the method of the invention, then in a preferred embodiment a quality value for a respective link is defined such that the difference between 100% probability and a probability term is determined which, expresses as a power, the predetermined probability of an unsuccessful data transmission on the respective link with the number of time slots assigned within the assignment sequence to the respective link. This difference then represents the quality value for a respective link within an assignment sequence.

In a further, especially preferred, embodiment of the method of the invention, the overall quality value for an assignment sequence is formed as the product of the quality values determined for the respective links and especially as a product of the differences defined above for the respective links.

As already mentioned above, the method in accordance with the invention is characterized by energy-efficient operation of the network. Accordingly the method is preferably executed in a mesh network comprising a wireless sensor network in which the network nodes are at least partly sensors with an autonomous energy supply, such as battery-operated sensors. Nonetheless, the method can also be used in sensor networks in which sensors are not subject to any energy restrictions.

In addition to the method for assigning time slots to a transmission path in a wireless mesh network, the invention further comprises a method resulting from this for time slot-based data transmission in a wireless mesh network with a plurality of network nodes. In this case, time slots are assigned to a transmission path in accordance with the above-described embodiments of the method, where data based on this assignment is transmitted between the source node and the destination node. The presently contemplated method can be combined with data transmission methods known per se, such as the conventional standards WirelessHART, Institute of Electrical and Electronic Engineers (IEEE) 805.15.4, or Industry Standard Architecture (ISA) 100.11.a. In such cases, the assignment of the time slots to network nodes merely has to be realized in a network management unit.

The invention further relates to a network management unit for a wireless mesh network comprising a plurality of network nodes communicating wirelessly with one another, where the network management unit is configured such that the time slots are assigned to a transmission path based on the above-described embodiments of the assignment method in accordance with the invention. In addition, the invention relates to a wireless mesh network comprising a plurality of network nodes communicating wirelessly with one another with such a network management unit. In this case, the network nodes and the network management unit are configured such that they can transmit data based on the above-described transmission method in accordance with the disclosed embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described in detail below with reference to the enclosed figures, in which.

DETAILED DESCRIPTION OF THE PREFERRED EMBODIMENTS

Figure 1:
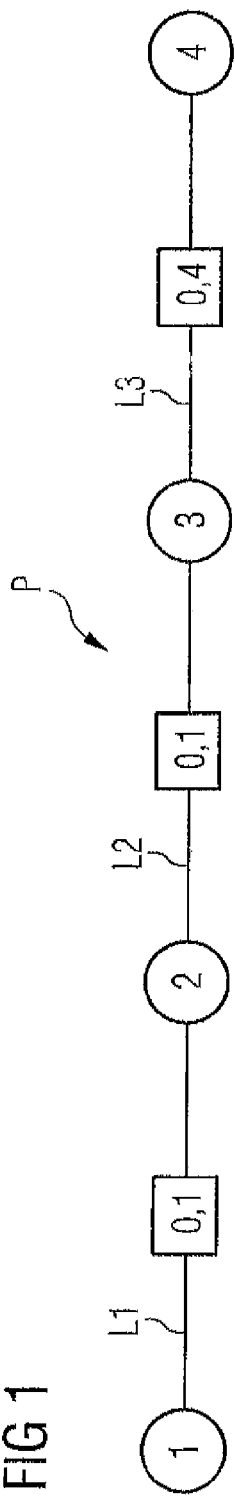
FIG. 1 shows a schematic block diagram of a transmission path, to the links of which time slots are assigned based on an embodiment of the method in accordance with the invention.

An embodiment of the method for a multi-hop mesh network in accordance with the invention is described below, with time slot-based transfer of data packets with a suitable standard, such as WirelessHART. Here, the method in accordance with the invention relates to an innovative assignment of time slots to corresponding wireless links of a predetermined transmission path between a source node and a destination node, where, in addition to the most reliable possible data transmission, use of the network nodes which is as reliable as possible is guaranteed. The method is especially suitable for use in sensor networks in which at least some of the network nodes are sensors, which as a rule have on autonomous energy supply (e.g., batteries) available to them.

The object of the embodiments described below is now to guarantee a predetermined minimum reliability of data transmission along a transmission path with simultaneous overall energy consumption of the network nodes which is as low as possible. Here, the energy consumption of the individual network nodes is all the smaller the less frequently time slots have to be used for a data transmission. The reason for this is that energy consumption, at least by the network node listening in the radio channel, is always associated with the use of a time slot.

An exemplary embodiment of the invention is explained below based on the transmission path P shown in FIG. 1 from the source node 1 through to the destination node 4 via nodes 2 and 3. Here, the transmission path comprises a wireless link L1 between nodes 1 and 2, a wireless link L2 between nodes 2 and 3 and a wireless link L3 between nodes 3 and 4. Link L1 has a packet error probability for an individual time slot during data transmission of 0.1. Accordingly, link L2 has a packet error probability of likewise 0.1 and link L3 a packet error probability of 0.4. In this case, the transmission path is part of a directed graph structure that represents a wireless mesh multi-hop network.

The individual links L1 to L3 are assigned predetermined data transmission reliabilities which are known in advance and describe the reliability of data transmission in a one-time use of a time slot. In such cases, the reliabilities result from the error probabilities defined above. Within the framework of the invention, an assignment sequence of time slots to the links of the transmission path is specified step-by-step. This assignment sequence can be used for an end-to-end data transmission along the transmission path. In this case, a predetermined minimum overall reliability for the end-to-end data transmission in accordance with the assignment sequence is to be maintained. In general terms, the consecutive links of a transmission path comprising h hops are designated $(l_1, l_2, \ldots, l_h)$ below. Furthermore, the minimum reliability for a time slot assignment along the transmission path mentioned above is specified by $p_{min}$.

The principle of the inventive time slot assignment is based on the individual links of the transmission path being allocated time slots in an energy-efficient manner, where at the same time the reliability $p_{min}$ described above is maintained. This is achieved by the following strategy:

a) Initially each link of the transmission path is consecutively allocated a time slot 1, where the reliability for this assignment sequence is subsequently determined. The calculation of this reliability will be described in greater detail below.
b) If the reliability determined is less than the minimum reliability $p_{min}$, a search is made for the link $l_i$ which has the lowest reliability.
c) Subsequently this link $l_i$ is allocated an additional time slot directly after the time slot just assigned. The new reliability is produced for the link $l_i$ by this which is higher, since now two time slots are used for data transmission. The calculation of this new reliability will be described in greater detail below.
d) Finally, taking into account the new transmission reliability of the link $l_i$, the overall reliability of the data transmission along the transmission path is determined. If this is still less than the minimum reliability, the method returns to the above step b), i.e., a search is made once again for the link with the lowest reliability, where this link can now be a link other than the link previously determined. Subsequently in accordance with step c) this link is assigned a further time slot. Finally, a check is made once again as to whether the overall reliability is now less than the minimum reliability.

The above strategy is repeated until such time as the transmission reliability along the transmission path is greater or exactly the same as the minimum reliability $P_{min}$. If, in the above methods of searching for links, a number of links occur with the smallest transmission reliability, a further time slot is assigned to that link which lies closest to the destination node in the transmission path. This takes account of the fact that, as regards energy usage, it is better to embody links at the end of the transmission path more reliably than at the start of the transmission path, since during a transmission over a link of the transmission path, a larger quantity of energy has been used up by the preceding network nodes than was the case at the start of the transmission path.

A practical example of the above strategy is explained below based on the transmission path P of FIG. 1 with the corresponding packet error rates. In this case, the predetermined reliability for a data transmission in an individual time slot is represented by the difference between 100% probability and the corresponding error probability. This means that the predetermined reliability for the link L1 and L2 amounts to 0.9 and for the link L3 to 0.6. If links are used multiple times in an assignment sequence for data transmission the corresponding reliability of a multiply-used link is produced by the difference between 100% probability and the power of the predetermined reliability of the link in accordance with the number of the time slots assigned to the link. The overall reliability along the transmission path can be calculated by the product of the reliabilities of the individual links.

Figure 2:
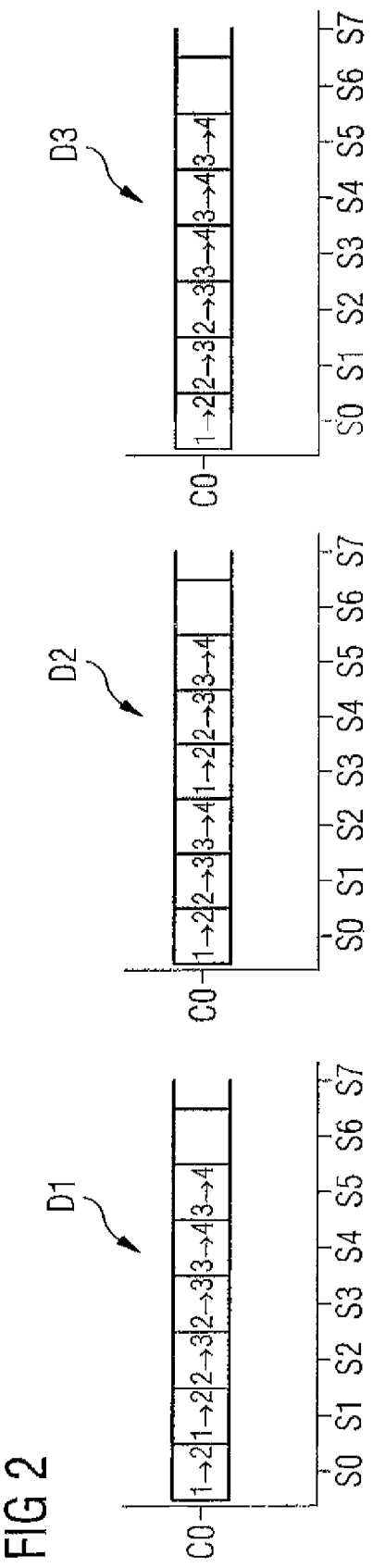
FIG. 2 shows a schematic block diagram which compares the method for assignment of time slots to the transmission path of FIG. 1 with other embodiments of a method of the assignment of time slots.

FIG. 2 shows in diagrams D1 through D3 three assignment sequences of time slots S0, S1, . . . , S7 to links of the transmission path P of FIG. 1 for a transmission in a channel C0. In this diagram, the notation >>1→2<< refers to the assignment of a corresponding time slot to link L1, the notation >>2→3<< to the assignment the corresponding time slot to the link L2 and the notation >>3→4<< to the assignment of the corresponding time slot to link L3. Diagram D3 shows a time slot assignment sequence based on the method in accordance with the invention. By contrast, diagram D1 shows a time slot assignment based on a one-off repetition of each time slot, in that two slots are first assigned to link L1, subsequently two time slots are assigned to link L2 and finally two time slots are assigned to link L3. By contrast, diagram D2 relates to a time slot assignment in which the data transmission along the entire transmission path is repeated once, i.e., initially time slots are allocated consecutively to the links L1, L2 and L3 and this assignment is subsequently repeated once. Depending on the allocation strategy, different overall reliabilities and energy consumptions are produced for D1 to D3.

D1 is compared below to D3. For the assignment in accordance with diagram D1, the overall reliability is calculated as follows:

$$(1-0,1^2)\cdot(1-0,1^2)\cdot(1-0,4^2)=0.823.$$

This overall reliability has been defined as the minimum reliability for the method in accordance with the invention. Based on this minimum reliability, the time slot assignment is then calculated in accordance with the method steps described above according to diagram D3. To determine this time slot assignment, a time slot was initially assigned to each of the links L1 through L3. For this assignment, a reliability value of $(1-0,1)\cdot(1-0,1)\cdot(1-0,4)=0.486$ is produced. This value is less than $p_{min}=0.823$. Therefore, a further time slot is assigned to link L3, which has the lowest reliability of 0.6. This produces the new reliability of $(1-0,1)\cdot(1-0,1)\cdot(1-0,4.0,4)=0.68$.

The link with the lowest reliability, despite having been twice assigned time slots, is still link L3, with a reliability of 0.84. Therefore, this link is assigned a further timeslot. This produces a new overall reliability of $(1-0,1)\cdot(1-0,1)\cdot(1-0,4^3)=0.758$. This overall reliability is still lower than $p_{min}$. Now, however, links L1 and L2 have a lower reliability gambling L3. Since link L2 is closer to destination node 4, this link will now be allocated a further time slot. This produces an overall reliability of $(1-0,1)\cdot(1-0,1^2)\cdot(1-0,4^3)=0.834$. This overall reliability is now greater than $p_{min}$, so that the time slot allocation is concluded. This time slot assignment is also shown in diagram D3.

Within the framework of simulations, the inventors have compared the time slot assignment in accordance with diagram D3 with the time slot assignments in accordance with diagrams D1 and D2. In these cases, the assignments were repeated a number of times consecutively. It could be established in such cases that the overall energy consumption with the same overall reliability of the network nodes for a data transmission in accordance with the inventive time slot assignment in accordance with diagram D3 is less than for a data transmission in accordance with the assignments of diagrams D1 and D2.

As emerges from the information given above, a time slot-based data transmission can be achieved with the method in accordance with the invention in which, on the one hand, a minimum quality of data transmission is guaranteed and, on the other hand, the energy consumption of the network nodes involved in the data transmission is as low as possible. The method is thus especially suitable for networks in which a low energy consumption of the individual network nodes is of great importance. A preferred application is therefore the use of the method in sensor networks of which the network nodes are partly sensors with an autonomous energy supply, such as battery-operated sensors.

Figure 3:
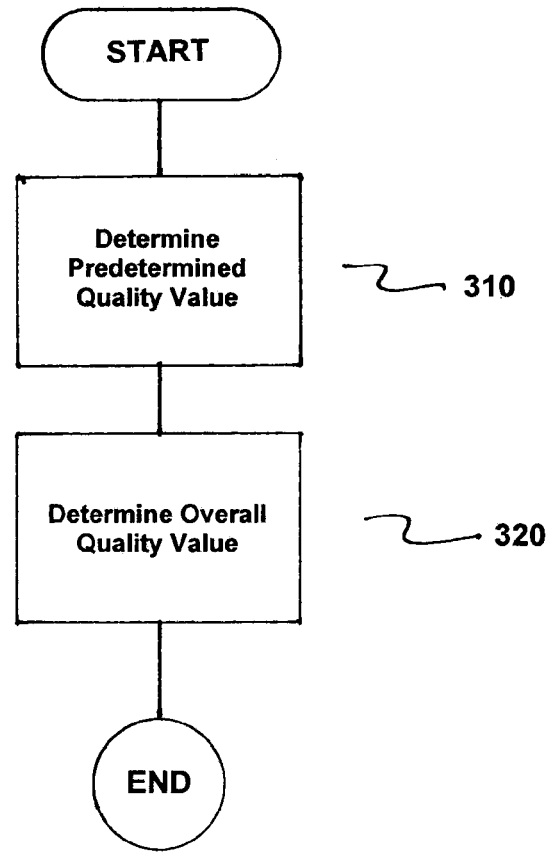
FIG. 3 is a flowchart of the method in accordance with an embodiment of the invention.

FIG. 3 is a flow chart of a method of assigning time slots to a transmission path in a wireless mesh network comprising a plurality of network nodes, where the transmission path extends between a source node and a destination node in the wireless mesh network and comprises a plurality of consecutive links between adjacent network nodes of the plurality of network nodes, and where data is transmitted in the network based on the time slots by the assignment of time slots to be used for data transmission to links of a transmission path. The method comprises determining a predetermined quality value produced from a number of the time slots assigned to a respective link within an assignment sequence and a predetermined quality value for the respective link within an assignment sequence of time slots which indicates an end-to-end data transmission from the source node to the destination node along the transmission path, as indicated in step 310. Here, the predetermined quality value indicates a reliability of the data transmission on a respective link for an individually assigned time slot.

The overall quality value is then determined as a function of quality values of respective links for the assignment sequence, as indicated in step 320.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of assigning time slots to a transmission path in a wireless mesh network comprising a plurality of network nodes, the transmission path extending between a source node and a destination node in the wireless mesh network and comprising a plurality of consecutive links between adjacent network nodes of the plurality of network nodes, data being transmitted in the network based on the time slots by the assignment of time slots to be used for data transmission to links of a transmission path, the method comprising:

determining a predetermined quality value produced from a number of the time slots assigned to a respective link within an assignment sequence and a predetermined quality value for the respective link within an assignment sequence of time slots which indicates an end-to-end data transmission from the source node to the destination node along the transmission path, the predetermined quality value indicating a reliability of the data transmission on a respective link for an individually assigned time slot; and determining an overall quality value as a function of quality values of respective links for the assignment sequence, determination of the assignment sequence comprising:

assigning, consecutively, a time slot to each link of the links of the transmission path and determining an overall quality value for a resulting intermediate assignment sequence;

assigning a further time slot to a link immediately after at least one time slot already assigned to the link of the transmission path and having a lowest quality value within the resulting intermediate assignment sequence, and determining the overall quality value for a new resulting intermediate assignment sequence while the overall quality value for the resulting intermediate assignment sequence is less than a predetermined minimum quality value; and defining the resulting intermediate assignment sequence as a determined assignment sequence if the overall quality value for the resulting intermediate assignment sequence is greater than the predetermined minimum quality value.

2. The method as claimed in claim 1, wherein, in an event of a number of links having a lowest quality value while the overall quality value for the resulting intermediate assignment sequence is less than the predetermined minimum quality value, a further time slot is assigned to that link which is closest to the destination node in accordance with the transmission path.

3. The method as claimed in claim 2, wherein the predetermined quality value for the respective link is represented by a probability value produced from a difference between 100% probability and a predetermined probability of an unsuccessful data transmission on the respective link in an individual time slot.

4. The method as claimed in claim 1, wherein the predetermined quality value for the respective link is represented by a probability value produced from a difference between 100% probability and a predetermined probability of an unsuccessful data transmission on the respective link in an individual time slot.

5. The method as claimed in claim 4, further comprising: specifying the predetermined quality value for the respective link within the assignment sequence such that the difference between 100% probability and a probability term which provides a power of the predetermined probability of an unsuccessful data transmission on the respective link with a number of the time slots assigned to the respective link within the assignment sequence.

6. The method as claimed in claim 1, wherein the overall quality value for the assignment sequence is specified as a quality value determined for the respective links.

7. The method as claimed in claim 1, wherein the wireless mesh network comprising a wireless sensor network, wherein the plurality of network nodes at least partly represents sensors.

8. The method as claimed in claim 7, wherein the sensors include an autonomous energy supply.

9. A method for time slot-based data transmission in the wireless mesh network comprising the plurality of network nodes, wherein time slots are assigned to a transmission path in accordance with the method as claimed in claim 1 and data is transmitted based on this assignment between the source node and the destination node on a channel.

10. The method as claimed in claim 9, wherein the data transmission occurs in accordance with one of a Wireless HART standard, Institute of Electrical and Electronic Engineers standard 802.15.4e and Industry Standard Architecture 100.11a.

11. A network management unit for a wireless mesh network comprising:

a plurality of network nodes communicating wirelessly with one another, wherein the network management unit is configured such that time slots are assignable by:

determining a predetermined quality value produced from a number of the time slots assigned to a respective link within an assignment sequence and a predetermined quality value for the respective link within an assignment sequence of time slots which indicates an end-to-end data transmission from a source node to a destination node along a transmission path, the predetermined quality value indicating a reliability of the data transmission on a respective link for an individually assigned time slot; and determining an overall quality value as a function of the quality values of respective links for the assignment sequence, determination of the assignment sequence comprising:

assigning, consecutively, a time slot to each link of the links of the transmission path and determining an overall quality value for a resulting intermediate assignment sequence;

assigning a further time slot to a link immediately after at least one time slot already assigned to the link of the transmission path and having a lowest quality value within the resulting intermediate assignment sequence, and determining the overall quality value for a new resulting intermediate assignment sequence while the overall quality value for the resulting intermediate assignment sequence is less than a predetermined minimum quality value; and defining the resulting intermediate assignment sequence as a determined assignment sequence if the overall quality value for the resulting intermediate assignment sequence is greater than the predetermined minimum quality value.

12. A wireless mesh network comprising:

a plurality of network nodes communicating wirelessly with one another; and a network management unit for the wireless mesh network, wherein the plurality of network nodes and the network management unit are configured to transmit the data by:

determining a predetermined quality value produced from a number of the time slots assigned to a respective link within an assignment sequence and a predetermined quality value for the respective link within an assignment sequence of time slots which indicates an end-to-end data transmission from a source node to a destination node along a transmission path, the predetermined quality value indicating a reliability of the data transmission on a respective link for an individually assigned time slot; and determining an overall quality value as a function of the quality values of respective links for the assignment sequence, determination of the assignment sequence comprising:

assigning, consecutively, a time slot to each link of the links of the transmission path and determining an overall quality value for a resulting intermediate assignment sequence;

assigning a further time slot to a link immediately after at least one time slot already assigned to the link of the transmission path and having a lowest quality value within the resulting intermediate assignment sequence, and determining the overall quality value for a new resulting intermediate assignment sequence while the overall quality value for the resulting intermediate assignment sequence is less than a predetermined minimum quality value; and defining the resulting intermediate assignment sequence as a determined assignment sequence if the overall quality value for the resulting intermediate assignment sequence is greater than the predetermined minimum quality value.

* * * * *